US011921797B2

(12) United States Patent
Liu et al.

(10) Patent No.: US 11,921,797 B2
(45) Date of Patent: Mar. 5, 2024

(54) COMPUTER SERVICE FOR INDEXING THREADED COMMENTS WITH PAGINATION SUPPORT

(71) Applicants: Atlassian Pty Ltd., Sydney (AU); Atlassian Inc., San Francisco, CA (US)

(72) Inventors: Jennifer Liu, Santa Clara, CA (US); Mikhael Tanutama, Mountain View, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 338 days.

(21) Appl. No.: 17/138,005

(22) Filed: Dec. 30, 2020

(65) Prior Publication Data

US 2022/0207092 A1 Jun. 30, 2022

(51) Int. Cl.
| | |
|---|---|
| G06F 16/22 | (2019.01) |
| G06F 16/951 | (2019.01) |
| G06Q 10/107 | (2023.01) |
| H04L 51/52 | (2022.01) |

(52) U.S. Cl.
CPC ............ *G06F 16/951* (2019.01); *G06F 16/22* (2019.01); *G06Q 10/107* (2013.01); *H04L 51/52* (2022.05)

(58) Field of Classification Search
CPC .............................. G06F 16/322; G06F 40/114
See application file for complete search history.

(56) References Cited

U.S. PATENT DOCUMENTS

| | | | | |
|---|---|---|---|---|
| 2012/0158753 | A1* | 6/2012 | He | G06F 16/24578 707/752 |
| 2014/0325337 | A1* | 10/2014 | McWeeney | G06F 16/972 |
| 2017/0139878 | A1* | 5/2017 | Halpern | G06F 16/35 |
| 2018/0293278 | A1* | 10/2018 | Kapoor | G06F 16/3346 |

FOREIGN PATENT DOCUMENTS

FR          0606788 A1 * 12/1993          G06F 15/40

* cited by examiner

*Primary Examiner* — Son T Hoang
(74) *Attorney, Agent, or Firm* — Brownstein Hyatt Farber Schreck, LLP

(57) ABSTRACT

Embodiments include a computer-implemented method for storing comments received at a collaboration page of a content collaboration system in a hierarchical relationship that corresponds to the comments position in a comments field. The method can include receiving a comment at a user interface displaying the collaboration page and creating a thread identification string for the comment having a set of string portions. The method can also include obtaining a comment index file comprising an ordered list of previously-entered comments having respective thread identification strings, adding the comment and thread identification string to the ordered list of previously-entered comments at a location indicated by the thread identification string, designating a pagination of the ordered list of previously-entered comments in the comment index file in accordance with a fixed number of simultaneously viewable lines, and displaying a subset of the ordered list of previously-entered comments in the comment field.

19 Claims, 5 Drawing Sheets

COMPUTER SERVICE FOR INDEXING THREADED COMMENTS WITH PAGINATION SUPPORT

FIELD

The described embodiments relate generally to methods, techniques, and systems for content threading. More particularly, the present embodiments relate to processes for generating a comments field for a collaboration page.

BACKGROUND

Users may view content on a content platform on a webpage or other similar content-providing media. Rather than simply provide a one-way communication from the author to the reader, some content platforms allow for users to engage with the author or with each other through a series of comments. The comments allow for an ongoing discussion that may span days, weeks, or even years. Accordingly, it is difficult to predict the length of a comment field and, over time, the length of the comment field may become many times longer than the original content, making browsing difficult, especially on a relatively small display of a mobile phone or tablet. While the comment field may be truncated, it may be difficult to determine where the stream of comments should be uniformly partitioned, especially if users have the ability to create nested comments in which a parent comment may have multiple layers of nested children comments and replies.

The systems and techniques described herein may be used to create a comment index that does not have drawbacks associated with some traditional techniques.

SUMMARY

Embodiments are directed to a computer-implemented method for generating a comments field for a collaboration page of a content collaboration system that includes receiving a comment at a user interface displaying the collaboration page, where the collaboration page includes a comment field having a fixed number of content lines. The method can include creating a thread identification string for the comment, where the thread identification string has a set of string portions. In response to determining that the comment has a first parent comment, the method can include determining a first-level comment order corresponding to the first parent comment, and determining a first string portion of the set of string portions in accordance with the first-level comment order. In response to determining that the comment has a second parent comment that is dependent on the first parent comment, the method can include determining a second-level comment order corresponding to the second parent comment, and determining a second string portion of the set of string portions in accordance with the second-level comment order. In response to determining that the comment has a third-level parent comment that is dependent on the second parent comment, the method can further include determining a third-level comment order based on a last-entered third-level comment, and determining a third string portion of the set of string portions in accordance with the third-level comment order. In some cases, the method includes obtaining a comment index file comprising an ordered list of previously-entered comments having respective thread identification strings, and adding the comment and thread identification string to the ordered list of previously-entered comments at a location in accordance with the thread identification string. The method can further include designating a pagination of the ordered list of previously-entered comments in the comment index file, and displaying a subset of the ordered list of previously-entered comments in the comment field in accordance with the designated pagination stored in the comment index file.

Embodiments are also directed to a computer-implemented method for storing comments received at a collaboration page of a content collaboration system in a hierarchical relationship that corresponds to the comments position in a comments field. The method can include receiving a comment at a user interface displaying the collaboration page, the collaboration page including a comment field having a fixed number of simultaneously viewable content lines, and creating a thread identification string for the comment, where the thread identification string has a set of string portions. In response to determining that the comment is dependent on a root-level comment, the method can include determining a first-level comment order corresponding to when the root-level parent comment was created, and determining a first string portion of the set of string portions in accordance with the first-level comment order. In response to determining that the comment has a second parent comment that is dependent on the root-level comment, the method can include determining a second-level comment order corresponding to the second parent comment, and determining a second string portion of the set of string portions in accordance with the second-level comment order. The method can also include obtaining a comment index file comprising an ordered list of previously-entered comments having respective thread identification strings, and adding the comment and thread identification string to the ordered list of previously-entered comments at a location indicated by the thread identification string. The method can further include designating a pagination of the ordered list of previously-entered comments in the comment index file in accordance with a fixed number of simultaneously viewable lines, and displaying a subset of an ordered list of previously-entered comments in the comment field in accordance with the designated pagination stored in the comment index file.

Embodiments are further directed to a computer-implemented method for storing and displaying comments received at a collaboration page of a content collaboration system. The method can include receiving a comment at a user interface displaying the collaboration page, where the collaboration page includes a comment field having a fixed number of content lines, and creating a thread identification string for the comment, where the thread identification string has a set of string portions. In response to determining that the comment has a parent comment, the method can include determining a first set of string portions for the parent comment, assigning the comment the first set of string portions from the parent comment, determining an order the comment was received with respect to other comments that directly depend from the parent comment, and assigning the comment a second set of string portions corresponding to the order the comment was received. The method can also include obtaining a comment index file comprising a list of previously-entered comments that are ordered according to their respective thread identification strings, and adding the comment and thread identification strings to the list of previously-entered comments at a location in the list according to the thread identification string for the comment. The method can further include designating a pagination of the list of previously-entered comments in the comment index file, and displaying a subset of the list of previously-entered comments in the comment field in accordance with the designated pagination stored in the comment index file.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
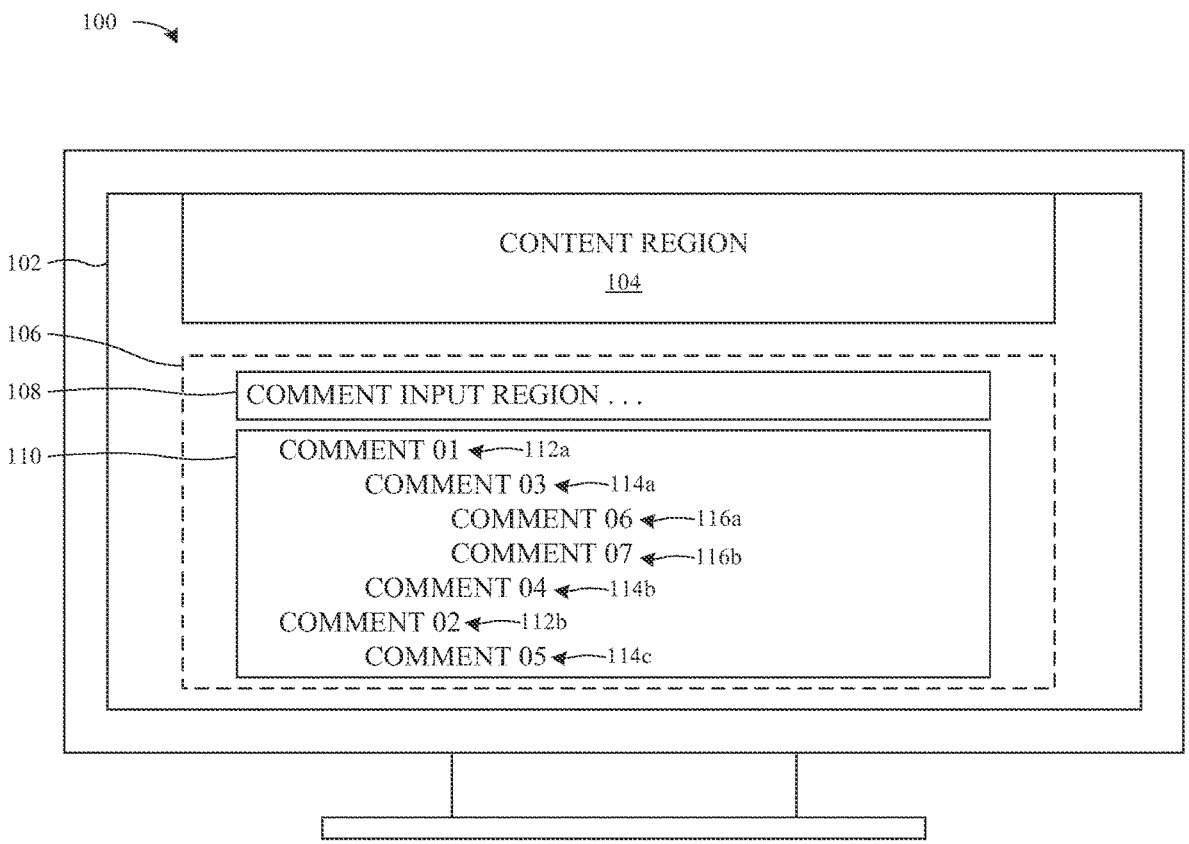
FIG. 1 depicts an example user interface for a comment thread for a content collaboration system in which various features of the present disclosure may be implemented.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Users may view content on a content platform such as a webpage, editable documents, or other collaborative content platform that is provided over a network connection such as the internet. The content may be organized in nodal relationships or other constructs that uses similar parent-child relationships. For example, a webpage or collaborative document may allow users to comment on content on the platform and/or make comments to other users' comments. Frequently, these comments are displayed on the page along with the other content. A comment that does not depend on any other comments may be referred to as a "root-level comment" and comments that are in response to (depend from other comments) may be referred to as "dependent comments." Root-level comments and dependent comments can be received in almost any order.

As described herein, it may be desirable to display comments according to their hierarchical relationship. For example, dependent comments can be displayed directly under their root-level comment, comments that depend from a dependent comment can be displayed in relation to their dependent comment, and so on. In some cases, the display region for these comments may have a fixed size that displays only a portion of the received comments at a given time. Although, the present disclosure focuses on examples related to comment threading, the concepts described herein can be applied to other nodal relationships or constructs that use similar hierarchical relationships.

Embodiments described herein reference systems and methods for receiving, storing and displaying comments on a content collaboration system. The systems and methods include creating index files for storing comments in a database that organizes the comments based on their hierarchical relationship instead of organizing the comments based on the order they were received at the content collaboration system. A collaboration page such as a webpage, collaboratively edited document, or the like may include a comment thread that has a user interface for entering comments and a comment field to display the comments. The comment thread may allow users to make a new comment that does not depend on other comments, for example, a comment about content contained on the collaboration page. These types of comments, which do not depend from another comment, may be referred to herein as "root-level comments." The comment thread may also allow users to comment in response to other comments that have already been posted on the thread. A user may comment on a root-level comment or comments that stem from a root-level comment. Comments that depend from another comment, either a root-level comment or a comment stemming from a root-level comment, may be referred to herein as a "dependent comments." In this regard, a thread may have multiple levels of comments that have a hierarchical relationship stemming from each root-level comment.

In many cases, comments may be entered and received by a comment thread system in almost any order. For example, at least one root-level comment will be entered first, and after that, users may provide additional root-level comments, comments that depend from a root-level comment, comments that depend from a dependent comment to a root-level comment, and so on. In this regard, various levels of hierarchy may exist in the comment thread, which stems from each root-level comment. In some cases, comments in a thread may be displayed in a comment field in a manner that portrays the hierarchy of the comments. For example, root-level comments may be left justified in the comment field, and first-level comments that depend directly from a root-level comment may be displayed under the root-level comment and have single indentation from the left margin to show their direct dependence on the root-level comments. Comments that directly depend from the first-level comments may be displayed under the first-level comment that they depend from and be double indented from the left margin (or single indented from the first-level dependent comment) to show their direct dependence from a first-level comment. Such a format may be used to display comments received by a content collaboration system. Although, this is one example format, other formats may be used such as numbers, bullet lists, different font sizes or styles, different color schemes, and so on.

Comments may be received in almost any order, and thus the timing of when a comment is received may have little or no bearing on its hierarchical relationship to other comments. Traditional comment thread systems may store comments in an index file in the order they are received. Accordingly, if the comments are to be displayed in a hierarchical relationship, the entire index file needs to be parsed to identify the dependence of each comment. Further, in some cases, many more comments are received than can be displayed at any given time. Accordingly, the comment thread may only display a subset of all the comments at any given time. When the comments are indexed in a time-dependent matter, such as based on the order they were received, the entire index needs to be parsed each time to identify which comments are to be displayed in the subset of comments. Further, the comment thread may need to be updated frequently to reflect recently added comments. Accordingly, traditional storage, retrieval, and display techniques may be inefficient and take more resources each time a comment display section of a comment thread is updated, because they may parse the entire index file for the comment thread each time the thread needs to be updated (e.g., each time a new comment is entered).

Embodiments described herein include determining and storing comments according to their hierarchical relationship. The systems and processes may include creating a thread identification string for received comments that is used to indicate each comment's relationship to other comments in the thread. The thread identification string can include a set of string portions that is populated based on the comments relationship (dependency) from other comments. For example, a first string portion may be used to indicate a root-level relationship. In this regard, root-level comments may each be assigned a unique first string portion that identifies an order each root-level comment was received relative to other root-level comments. A comment index file used to generate the comment index field can order the root-level comments based on each of their unique first string portions. In some cases this can result in the root-level comments being ordered in the index file according to the order they were received.

As dependent comments are received, the content collaboration system can determine a relationship of these comments to root-level comments or other dependent comments and assign a thread identification string to these dependent comments that indicate their hierarchical relationship. For example, first-level dependent comments that are directly dependent on a root-level comment (e.g., respond to and/or comment on a root-level comment), may be assigned a thread identification string that includes the first string portion of their root-level comment and a second string portion that indicates an order that the dependent comment was received relative to other comments that directly depend from the same root-level comment. If a root-level comment has multiple dependent comments, the second string portion can be used to indicate the order of these dependent comments relative to each other. In this regard, the thread identification string for first-level dependent comments indicates each of these comment's relationship to a root-level comment using the first string portion and a reply order of these comments relative to each other using the second string portion. In some cases, the comments can be organized in the index file using the thread identification string. In this regard, as new comments are received, the index file may be reconfigured to position the comment in the index file according to its relationship to other comments, instead of according to the order it was received.

Taking it one step further for the sake of illustration, comments that depend from a first-level dependent comment may be received. These comments may be referred to herein as second-level dependent comments. The second-level dependent comments can be assigned a thread identification string that includes a first string portion of the root-level comment that they are associated with (e.g., a root-level comment that their first-level comment depends from), a second string portion of the first-level dependent comment that they are associated with, and a third string portion that indicates the order in which the second-level dependent comment was received in relation to other second-level dependent comments that depend from the same first-level dependent comment. In this regard, the thread identification string for each second-level comment indicates its relationship to a root-level comment using the first string portion, its relationship to a first-level dependent comment using the second string portion, and its relationship to other second-level dependent comments that also depend from the same first-level dependent comment using the third string portion. The second-level dependent comments can also be added to the index file according to their hierarchical relationship indicated by their thread identification string. For example, a second-level dependent comment that depends from a first root-level comment can be inserted in an index file in a position before a second root-level comment that comes after the first root-level comment. Although, three levels of comment hierarchy (e.g., root-level comments, first-level dependent comments, and second-level dependent comments) are discussed, these concepts can apply to additional levels of comment dependency.

In some embodiments, pagination of the comments in the index file is client driven. For example, the index file can include an ordered list of received comments based on their thread identification string as described herein, and the number of content lines that can be simultaneously viewed in the comment thread may be driven by a client device. The client device can determine a pagination of comments within the index file based on the number of comments that can be simultaneously displayed in the comment field by the client device. Accordingly, a subset of the comments in the index file can be displayed on a user interface of the comment thread according to the pagination designated by the client device. Positioning the comments in the index file according to their thread identification string may allow more efficient retrieval and display of comments in a comment thread. For example, the comments may already be located in an index file according to their hierarchical relationship, which may result in only a relevant portion of the index file needing to be accessed when a subset of the comments is displayed or updated by the content collaboration system. In other examples, pagination of the comments can be designated in the index file, and the comments can be displayed with the same page breaks regardless of which client device they are viewed on.

These and other embodiments are discussed below with reference to FIGS. 1-5. However, those skilled in the art will readily appreciate that the detailed description given herein with respect to these Figures is for explanatory purposes only and should not be construed as limiting.

FIG. 1 depicts an example of user interface 100 for a comment thread hosted by a content collaboration system in which various features of the present disclosure may be implemented. The user interface 100 can display a collaboration page 102 that has a content region 104, and a comment thread 106 having a comment input region 108 and a comment field 110. The user interface 100 can be display a webpage, a collaborative document, or other content hosting system that displays content in a content region 104. The content input region can include text such as in the form of articles, stories, or other published works, pictures, videos, or other content, or a combination thereof. The comment thread 106 can provide a dedicated area on the collaboration page 102 for the users to provide comments such as comments 112, 114, and 116.

In some embodiments the content collaboration page 102 can display the comment thread as a dedicated region that includes the comment input region 108 and the comment field 110. In other cases, the comment input region 108 and the comment display region may be displayed as independent features on the content collaboration page 102. The comment input region 108 can include an interactive user region that allows a user to provide various inputs, which can include, text, graphic symbols (e.g., ideograms, smileys, or the like), pictures, animations, videos, voice recordings, speech to text, text to speech, or any other suitable input. In some embodiments, the comment input region 108 can define the type of inputs allowed, for example, to only allow text and graphic symbols. The comment input region 108 may allow a user to enter a comment, but may not submit that comment to be viewed in the field 110 until a user takes some action such as clicking a visual indictor displayed on the content collaboration page (e.g., "submit" button located by the comment input region). Once a user has entered and submitted a comment, the comment may be processed by the content collaboration system as described herein and displayed in the comment field 110. For example, a relationship of the comment to other comments may be determined and the comment may be displayed based on this relationship.

In some cases, the comment field 110 can have a fixed number of content lines that can be displayed simultaneously. For example, a comment field (e.g., comment field 110) having a fixed number of content lines may be able to simultaneously display a given number of content lines of text. In some cases, not all of the comments will be simultaneously displayed and the comment field can include a scroll bar or other similar affordance that allows the user to traverse or navigate the comments. It may be possible that a comment field is larger than a particular display of a user device, and thus, all of the comments are not simultaneously visible, and the comments may be provided in a scrollable format, or via other affordance that allows the user to change the comments that are displayed in the comment field 110. In some cases, the comments can be organized in a multi-page format, where the comment field 110 displays a single page or portion of a single page of comments simultaneously. The user interface 100 can include a selectable element that is used to navigate between different pages. For example, the user interface can include elements that traverse to a next page, a previous page, and/or allow a user to enter/select a desired comment page. In this regard, organizing the comments in a hierarchical format as described herein may facilitate direct navigation to a particular comment page without having to load all of the comments and/or parse an entire index file. In some embodiments, page navigation of the comments can be combined with a scrollable feature. In this regard, "a page" of comments can be loaded that is larger than the display size of the comment field 110, and a user may be able to scroll up or down to view additional comments on the same "page." Such feature may allow the comments to be paginated at natural breaks (e.g., between different hierarchy chains, such as between two different root-level comment threads).

In some cases, the number of "fixed" content lines may vary in accordance with a resizing or scaling of the graphical user interface or the comment field itself. For example, the graphical presentation may be scaled to fit on a particular device display or in a window of the operating system operating environment. Thus, for a given instance, the comment field may be fixed while still varying in size or number of lines depending on scaling or sizing conditions of various operating conditions. In some cases, the size of the comment field and number of content lines that are simultaneously displayed can be determined by each client device. Accordingly, different client devices may display different numbers of content lines. As used herein, the term "content lines" may refer to lines of text. However, it may also refer more generally to rows or a linear arrangement of characters, symbols, or other graphical objects depicted in the comment field.

In the illustrated example, the comment field 110 can display 7 lines of content simultaneously. In some cases, each comment may include one content line. In other cases, a single comment may take up multiple content lines, and fewer comments than the number of content lines may be displayed. Accordingly, more comments can be received at the content collaboration page 102 than can be simultaneously displayed in the comment field 110. Accordingly, the content collaboration system may organize the comments based on different relationships (e.g., time-based, hierarchical, most dependent comments, and so on) and determine a subset of comments to simultaneously display in the comment field 110.

In some implementations, comments received at the collaboration page 102 can be displayed in the comment field 110 based on their hierarchical relationship. Root-level comments 112 that do not depend from other comments may be organized and displayed according to the order they were received. For example, a first root-level comment 112a can be displayed at the top of the comment field 110 (comment 01), and a second root-level comment 112b (comment 02), which was received after the first root-level comment 112a, can be displayed below the first root-level comment 112a in the comment field 110. First-level dependent comments, which depend from a root-level comment, can be displayed below the root-level comment that they depend from. For example a first first-level dependent comment 114a that depends from the first root-level comment 112a can be displayed directly underneath the first root-level comment 112a to indicate the relationship of these comments to each other. A second first-level dependent comment 114b that depends from the first root-level comment 112a, can also be displayed below the first root-level comment 112a, and before (e.g., above) the second root-level comment 112b. Similarly, a third first-level dependent comment 114c can be displayed directly below the second root-level comment 112b. In some cases, the first-level dependent comments 114 can be indented with respect to the root-level comments 112 to indicate their dependency. In other cases, other visual indicators can be used to indicate this hierarchical relationship such as numbering, bullets, different font sizes and/or styles, and so on.

The content collaboration page 102 can also display second-level dependent comments 116, which directly depend from a first-level dependent comment 114. Each second-level dependent comment 116 can be displayed below the first-level dependent comment 114 that is depends from. For example a first second-level dependent comment 116a that depends from the first first-level dependent comment 114a can be displayed below the first first-level dependent comment 114a. A second second-level dependent comment 116b can also be received that also depends from the first first-level dependent comment 114a. The second second-level dependent comment 116b may be received after the first second-level dependent comment 116a. In this regard, the second second-level dependent comment 116b can also be displayed below the first first-level comment 114a and after the first second-level dependent comment 116a to indicate its relationship to the first first-level dependent comment 114a and the order it was received relative to the first second-level dependent comment 116a. In some cases, the second-level dependent comments 116 can be indented with respect to the first-level dependent comments 114 to indicate their dependency. In other cases, other visual indicators can be used to indicate this hierarchical relationship such as numbering, bullets, different font sizes and/or styles, and so on.

In some cases, the hierarchical format can be used to independently show or hide different levels of comments. For example, the content collaboration page 102 can display the comments in a fully expanded mode in which dependent comments are depicted below a corresponding parent comment. In some cases, the content collaboration page 102 can display the comments in a collapsible/expandable mode, in which dependent comments can be collapsed or hidden below their parent comment, and expand in response to an input such as a user interaction with an interface element. In this regard, different levels of comments can be independently expandable and collapsible which can cause the comment field 110 to show every comment, collapse dependent comments to only show root-level comments, and so on.

As described herein, comments may be received in almost any order. It may be desirable to organize and display the comments in a format other than the order they were received, for example, a hierarchical format as illustrated in FIG. 1. For example, the comments shown in FIG. 1 may be received in the following order indicated by their comment number: first root-level comment 112a (comment01); second root-level comment 112b (comment02); first first-level dependent comment 114a (comment03); second first-level dependent comment 114b (comment 04); third first-level dependent comment 114c (comment 05); first second-level dependent comment (comment06); and second second-level dependent comment (comment07). If these comments are added to an index file in the order they are received, as traditionally done, then each time a subset of the comments needs to be displayed in a hierarchical relationship in the comment field 110 the entire index file has to be parsed to determine which comments should be displayed. Such traditional operations can be inefficient and require more computing resources than necessary and/or require longer times to update the comment field 110 as comments are received.

The example of FIG. 1 is depicted with respect to a content collaboration system. A "content collaboration system" or "collaboration platform," as described herein, may be used to refer to a system that is configured to provide an interface for user- and/or group-defined workspaces that can be used as a resource for various teams and entities in an enterprise. A content collaboration system may include a collection of dynamic pages that organize and present content related to a team or project within an organization. Content collaboration systems, as described herein, may include user-created content, links, or portals to related resources or sites, and message boards, or other collaboration tools used to collect feedback and user input in addition to the comment fields and commenting functionality described with respect to other examples. The concepts described herein in relation to comment threading on content collaboration systems can be similarly applied to nodal data structures or other constructs that use similar hierarchical relationships. For example, the hierarchical organization of comments described herein can be applied to data structures including document tree constructs where different documents represent different nodes that are used to establish inter-relationship of the various documents; confluence pages that include nested information pages associated with content displayed on a platform; software development platforms that implement tracking systems such as issue tracking tickets that can have interdependent relationships with other tickets managed by the system; and so on.

Figure 2:
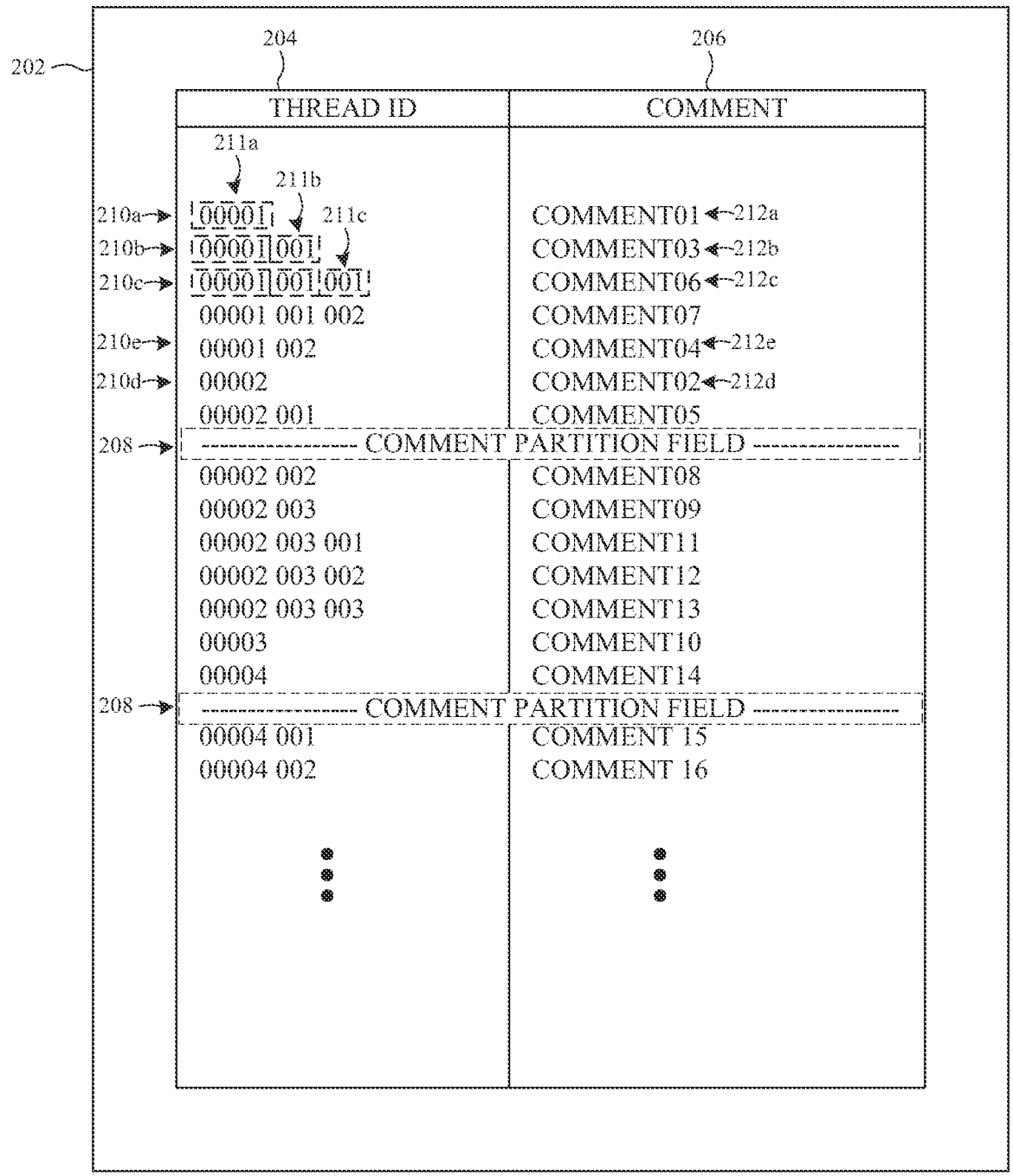
FIG. 2 depicts an example index file that may be used in the content collaboration system, described herein.

FIG. 2 depicts an example index file 200 that may be used in the content collaboration system, described herein. The index file 200 can include a thread identification ("thread ID") section 204, and a comment section 206, which may be organized in a column format or any other suitable format.

The thread identification section 204 can include a thread identification string 210 for each comment 212 received by the content collaboration system. The comments 212 can be contained in the comment section 206 of the index file. The thread identification strings 210 can be used to generate an ordered list of the comments 212 that organizes the comments into a hierarchical relationship based on their dependency as described herein. The index file 200 can also include comment field partition 208 that indicates a pagination of the ordered list of comments in the comment index file 200.

The comment may be received by the content collaboration system (e.g., at a collaboration page) in a first order, which is indicated in FIG. 2 by the number following the comment, for example, comment 01 was received first, comment 02 was received second, and so on. However, the comments 212 may be ordered within the index file based on their thread identification string 210, which is assigned to the comment based on their hierarchical relationship. The thread identification string 210 can have a set of string portions 211 that indicates a relationship of the comments. For example, a first string portion 211a may be associated with a root-level relationship, and each different root-level comment can have a different first string portion 211a. In some cases, the first string portion 211a indicates an order that the root-level comments were received with respect to each other. For example, the first string portion 211a can indicate that a first root-level comment 212a (comment01) was received before a second root-level comment 212d. In some cases, the first string portion 211a may be assigned a value that indicates this relationship, for example the 00001 value of the first string portion 211a for the first root-level comment 212a is lower than the value of the 0002 value of the first string portion 211a for the second root-level comment 212d. This is just one example, and the string portions 211 can be formatted in a variety of ways that are used to indicate the relationship of their respective comments 212.

The thread identification string 210 can also include a second string portion 211b, that is associated with a first-level dependent relationship. Each first-level dependent comment can have a thread identification string 210 that includes a first string portion 211a that indicates its relationship to a root-level comment and a second string portion 211b that indicates a first-level comment relationship to other first-level comments that depend from the same root-level comment. For example, a first first-level dependent comment 212b and a second first-level dependent comment 212e can each depend from the first root-level comment 212a, and the first first-level dependent comment 212b can be received before the second first-level dependent comment 212e. The string identification 210b for the first first-level comment 212a can include the same first string portion 211a of the first root-level comment 212a from which it depends (e.g., 00001), and a second string portion (e.g., 001) indicating that it was the first first-level dependent comment 212b associated with the first root-level comment 212a. The string identification 200e for the second first-level dependent comment 212e can include the same first string portion 211a of first root-level comment 212a from which it depends (e.g., 00001), and a second string portion (e.g., 002) indicating that it was the second first-level dependent comment associated with the first root-level comment 212a.

The thread identification string 210 can also include a third string portion 211c that is associated with a second-level dependent relationship. Each second-level dependent comment can have a thread identification string 210 that includes a first string portion 211a that indicates its relationship to a root-level comment, a second string portion 211b that indicates its relationship to a first-level dependent comment, and a third string portion 211c that indicates the second-level comment relationship to other second-level comments that depend from the same first-level comment. For example, a first second-level dependent comment 212c can depend from the first first-level dependent comment 212b. The thread identification string 210c for the first second-level comment can include the same first string portion 211a of first root-level comment 212a from which the first first-level comment 212b depends (e.g., 00001), a same second string portion 211b of the first first-level comment 212b (e.g., 001), and a third string portion 211c (e.g., 001) indicating that it was the first second-level dependent comment associated with the first first-level dependent comment 212b.

In some cases, the "string portion" can also be referred to as a sub-string having a length that is less than the tread identification string 210. A string portion can also be referred to as a set of character positions, fields, placeholders, or digits. The thread identification string 210 can be a series of hexadecimal, binary, or other positional numbering or indexing system. The thread identification string 210 can include numbers, a combination of numbers and characters, or other indexing system that can be used to organize the thread identification strings 210 (and their associated comments) in an ordered format. The thread identification string 210 can include additional characters or data not expressly depicted in the examples provided herein. For example, the thread identification string 210 can include index file information, time stamp information, a hash, or other comment key, and so on.

In some cases, determining the second-level comment order and a thread identification string for the second-level comment received at the content collaboration system can include determining a number of direct replies to the comment that the second-level comment depends from (e.g., a parent comment of the second-level comment) and incrementing that number by one.

In some embodiments, each client device can access the index file 200 and determine a pagination of the comments for the respective client device. For example, different client devices may display different numbers of content lines, which may be based on a configuration of the user interface associated with that client device. Accordingly, different client devices may simultaneously display different numbers of comments 212, and thus, each client device determines a pagination of the comments using the index file 200. In other embodiments, the index file 200 can include the comment field partition 208 to designate a pagination of the ordered list of previously-entered comments in the comment index file. In some cases, the comment field for comments can be a fixed size as described herein. This can include the comment field having a fixed number of content lines. The comment field partition 208 can be inserted into the index file to indicate which comments 212 can be simultaneously displayed in the comment field. In the example of FIG. 2, the comment field can simultaneously display seven content lines and each comment takes up one content line. Accordingly, the comment field partition 208 can indicate that pagination occurs after the first seven comments in the index file 200. In other examples, each comment 212 may take up more than one content line, and the comment field can be adjusted based on the number of content lines taken up by each comment 212.

Although three levels of hierarchy (e.g., root-level comments, first-level dependent comments, and second-level dependent comments) are illustrated with respect to FIG. 2, the same processes can apply to additional levels of comment hierarchy. For example, as comments with additional levels of hierarchy are received (e.g., third-level dependent, and so on), additional string portions can be added to the thread identification string 210.

Figure 3:
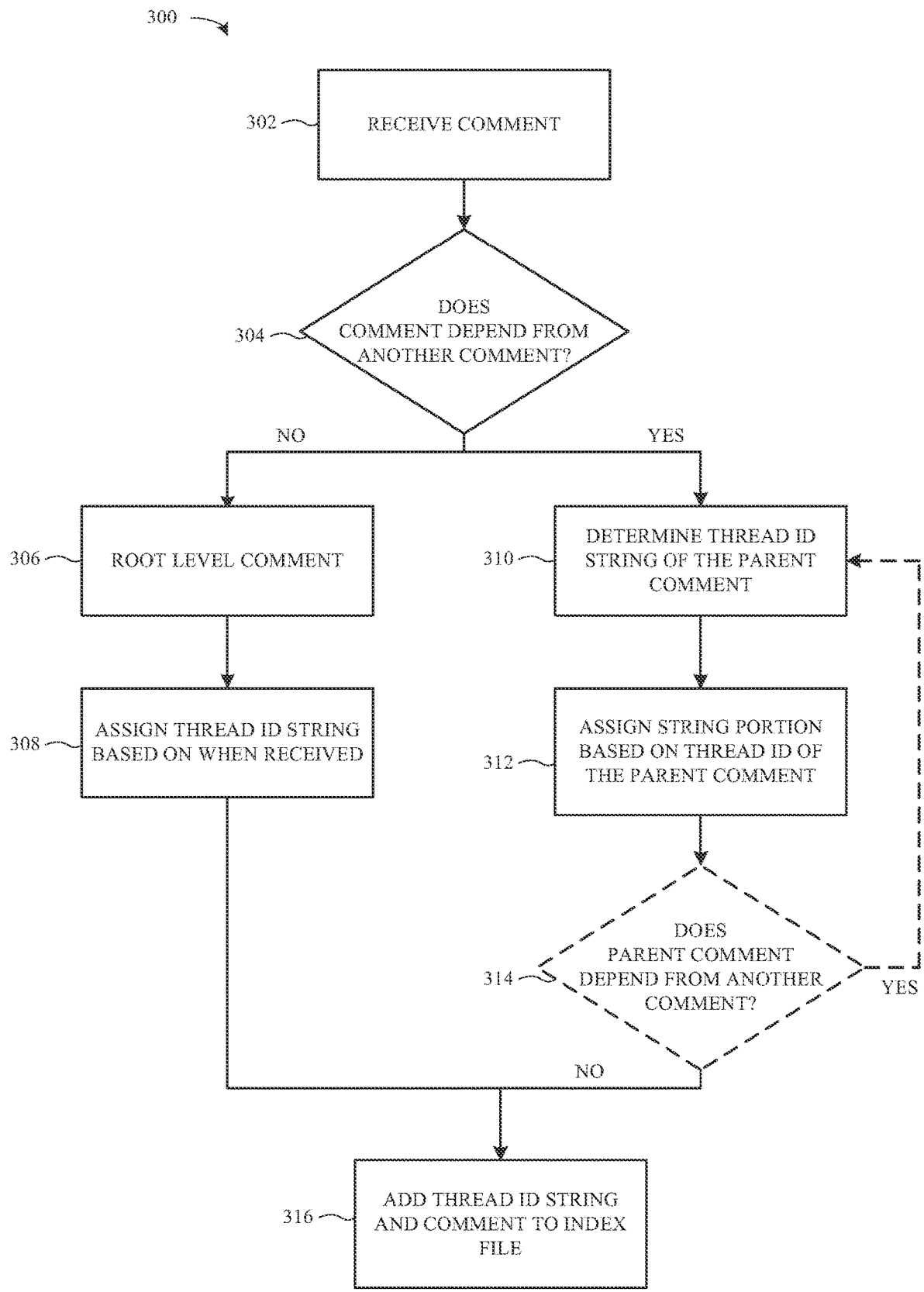
FIG. 3 depicts an example process flow for assigning thread identification strings to comments received at a content collaboration system.

FIG. 3 depicts an example process flow 300 for assigning thread identification strings to comments received at a content collaboration system. The process flow 300 can be performed by the systems described herein such as the content collaboration system. The process flow 300 provides an example of processes that may be used to generate an index file such as the index file described with reference to FIG. 2.

At 302, the process 300 can include receiving a comment, for example, at an input region of a collaboration page. The comment can be in response to content displayed on the collaboration page or to another comment that is input by a user at a user interface of the collaboration page.

At 304, the process 300 can include determining whether the comment depends from another comment in the comment thread. For example, a user may input a comment at a user interface of the collaboration page that does not depend from another comment. Such comment may be referred to as a root-level comment. In other cases, a user may respond to a comment that is displayed in a comment thread on the collaboration page. A comment that is a response to another comment may be referred to as a dependent comment. In some examples, a user can respond to a dependent comment that is displayed in the comment thread on the collaboration page. This comment may be referred to as a multiple dependent comment because it depends on the dependent comment that is stems from as well as that dependent comment's root-level comment. In other cases, comments can have additional levels of dependency. The following source code is provided as a non-limiting example of how operation 304 may be used to determine the dependency of the comment:

```
String createThreadId(Comment comment) {
    if (comment.getParent( ) == null) { // new root-level comment
        return comment.getCreatedAt( )
    } else { // new child comment
        return comment.getParent( ).getThreadId( ) + (comment.getParent(
            ).
getNumReplies( ) + 1)
    }
}
```

At 306 of the process 300, the comment is determined to be a root-level comment. In response to determining that the comment is a root-level comment, at 308 the process 300 can include assigning a thread identification string to the comment based on the order the comment was received. For example, the thread identification string can be configured to indicate a date, a time, or an order the comment was received with respect to other comments, or a combination thereof. In some cases, determining a thread identification string can include determining a last root comment that was received, and then incrementing and/or decrementing that value to obtain the new comments thread identification string. In some cases, the thread identification string can be a predefined string size and a value of the thread identification string can be used to indicate an order of the root-level comments relative to each other. For example, corresponding thread portions of different thread identification strings can be compared to determine root-level, first-level dependent, and second-level dependent relationships of the comments. In some cases, first string portions can be compared to determine a root-level relationship of comments, and comments, with the same root level, can be grouped together in the index file. In some cases, the thread identification string can be organized by increasing (or decreasing) the value. As comments are received with additional hierarchies additional string portions can be appended to the thread identification string to identify these dependent relationships. For example, a first root-level comment could be assigned the lowest first string portion, and as additional root-level comments are received, the first string portion is incremented. Then, as first-level dependent comments re received, they can be assigned a first string portion of the root-level comments and a second string portion based on the order it was received. For example, the thread identification string can include two string portions (e.g., ####-###), the first root-level comment can be assigned a thread identification of 0001 value, a second root-level comment can be assigned a thread identification of 0002, a first first-level dependent comment that depends from the first root-level comment can be assigned a thread identification string of 0001-001, and so on. The dependent comments associated with the first root-level comment would all have first string portions that are assigned first string portions that have 0001, which are, lower than the second root-level comment. Accordingly, regardless of the order the comments are received, they can be grouped in an index file according to their hierarchy. Although an increasing number identification string is shown, the thread identifications string can use any character combination that can be organized into an ordered format.

At 310 of the process 300, the comment is determined to be a dependent comment and the process 300 includes determining a thread identification string of the comment's direct parent comment. In cases where the comment is determined to be a dependent comment, the thread identification string can include multiple string portions that are used to indicate a relationship of the comment to other comments that it depends from.

At 312, the process 300 can include assigning a string portion to the thread identification of the comment based on the thread identification of the parent comment. For example, if the comment is a first-level dependent comment, such that it depends directly from a root-level comment, then a first string portion for the comment can include a string portion that is associated with the root-level parent comment. If the comment is a second-level dependent comment, such that is depends directly from a first-level dependent comment, then the second string portion for the comment can include a string portion that is associated with the first-level parent comment.

At 314, the process 300 may include determining if the parent comment of the comment depends from another comment. For example, if the parent comment is a first-level dependent comment, the process 300 can include determining the thread identification string from the parent of the first-level dependent comment (grandparent of the comment) at 310. Then, at 312, the process 300 can include assigning a higher level string portion to the comment based on the thread identification of its grandparent comment. For example, if the comment is a second-level dependent comment, then its grandparent comment is a root-level comment. In this example, the thread identification string for the comment can include a first string portion that is associated with the root-level comment (the grandparent comment). In cases where the comment has additional levels of dependency, steps, 314, 310, and 312 can be cycled through to generate the thread identification string for the comment until the root comment is located.

In other examples, at step 312, the comment can be assigned a beginning string portion that is the same as the string portion for its direct parent comment. For example, if the comment is a second-level dependent comment, then the first and second string portions for the comment can be assigned from the first and second string portions of its parent comment (the first-level dependent comment that it depends from). In these examples, step 314 may be skipped because the string portions associated with the comment's higher-level dependents (e.g., parent comment, grandparent comment, and so on) are derived directly from its parent comment.

At step 316, the process 300 can include adding the thread identification string that was determined for the comment to the comment index file, as described herein. This can include determining the position of the comment with respect to other comments that depend from the same direct parent comment. For example, if the comment is a second-level dependent comment, determining a string portion for the comment can include identifying the last-entered second-level dependent comment that depends from the same first-level dependent comment, and incrementing (or decrementing) the string portion in order to determine the relative position of the comment within the appropriate level (e.g., the second-level dependent comments). The process 300 can be repeated for each received comment and the comment index file can be updated as new comments are received. In this regard, comments can be added to the index file based on an order indicated by their thread identification string, which may be different from the order the comments are received at the content collaboration page.

Figure 4:
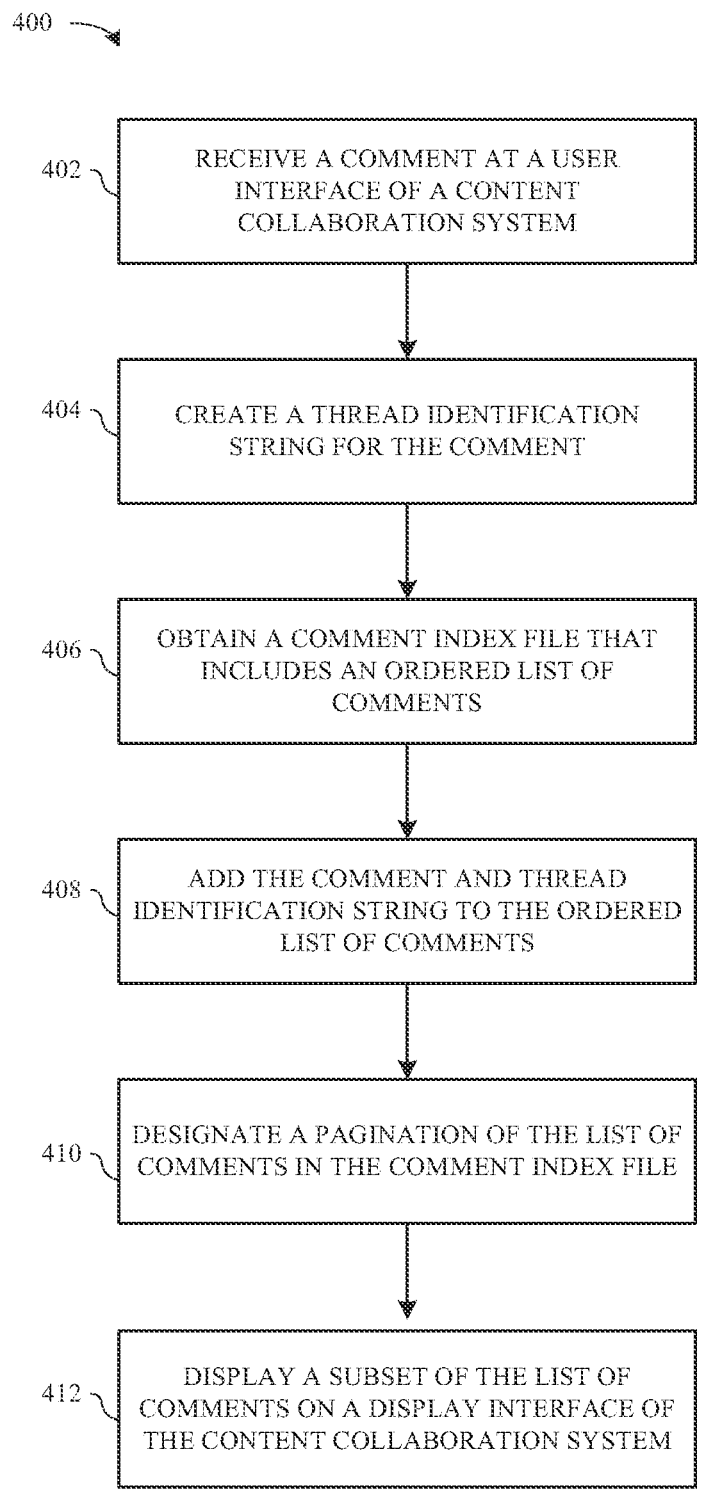
FIG. 4. depicts an example flow diagram of a process for receiving, storing, and displaying comments at a content collaboration system.

FIG. 4 depicts an example flow diagram of a process 400 for receiving, storing, and displaying comments at a content collaboration system.

At 402, the process 400 includes receiving a comment at a user interface of a content collaboration system. The comment can be an independent root-level comment or a dependent comment that is in response to a comment that is displayed in the comment field of a content collaboration page. The comments can be received from one or more users through a user interface that is shown on each user's client device. The displayed comment field can be updated by the content collaboration system as additional comments are submitted to the collaboration page.

At 404, the process 400 includes creating a thread identification string for the comment. The thread identification string can include a set of string portions that is used to indicate the comment's dependency on other comments as described herein. A length of the thread identification string can be configured to keep growing as additional comments of various hierarchies are received. For example, as comments that add a new dependency level are received, string portions can be added to the thread identification string to identify the new dependency level. In some cases, the set of string portions can each have a predefined length. For example, the first string portion can have a defined first string length and a second string portion has a defined second string length. In some examples, the second string length can be different from the first string length.

At 406, the process 400 includes obtaining a comment index file that includes an ordered list of comments that have already been received at the content collaboration page. In some cases, the comment index file can include an ordered list of previously-entered comments having respective thread identification strings. Having a predefined set of string portions can allow thread identification strings to be assigned to comments out of order. For example, if multiple root comments are received in a row, the thread identification strings for these comments may not be sequential, but instead leave unused thread identification strings that are reserved between each of the root-level comments that can be assigned to dependent comments.

At 408, the process 400 includes adding the comment and thread identification string to the ordered list of comments. Adding the comment and thread identification string to the ordered list of previously-entered comments can include updating the index file to incorporate the comment and thread identification string at a location in accordance with the thread identification string. For example, a thread identification with three string portions could include a 000-000-000 format, where the first string portion corresponds to root-level comments, the second string portion corresponds to first-level dependent comments, and the third string portion corresponds to second-level dependent comments. In this regard the first root-level comment can be assigned a thread identification string that is 0001-000-000, and the second root-level comment can be assigned a thread identification string that is 0002-000-000. Accordingly, as dependent comments to the first root-level comment are received, they can be assigned a thread identification string that is between the first root-level comment thread identification string (0001-000-000) and the second root-level comment thread identification string (0002-000-000). For example, a first first-level dependent comment can be assigned a thread identification string 0001-001-00, which can be added to the index file between the first and second root-level comments by the content collaboration system. That is, in some examples, the comment can be added to the ordered list of previously-entered comments based on a value of the thread identification string relative to values of the respective thread identification strings of the previously-entered comments. In this regard, the order of comments in the index file may represent their hierarchical relationship to each other, and comments that have the dependency can be grouped together even when they are received at different times.

In some cases, step 402 through step 408 of the process 400 is a write process in which an entered comment along with its associated data (e.g., thread identification string) are written to the database. Steps 410 through 412 may be executed as a read process in which one or more comments and the associated data is read from the database by a client device. In some examples, the write process (e.g., step 402 to step 408) can be performed as a separate process from the read process (e.g., steps 410 and 412). For example, the write process can be performed as comments are received at the system, and the read process can be separately initiated by a client device accessing the comment index file while retrieving comments for displaying on that client device.

At 410, the process 400 can include designating a pagination of the list of comments in the comment index file. For example, the positioning of a comment field partition can be used to have the pagination in the comment index file correspond to the fixed number of content lines that may be simultaneously viewable within the comment field. In some cases, the comment field partition can be updated as comments are added or deleted from the index file such that comments that are to be displayed next to each other in the comment field of the collaboration page are located in the same relationship in the index file. In some embodiments pagination of the comments can be client driven. For example, each client computer can determine a pagination of the comments for display on a user interface of the respective client device. Accordingly, the list of comments may be paginated in different locations based on the client device that the comments are displayed on.

At 412, the process 400 includes displaying a subset of the list of comments on a display interface of the content collaboration system. For example, a subset of comments in the index file that is grouped within the same pagination can be displayed in the content field of the collaboration page. The format and number of comments that are displayed can be client driven, for example, each client device can simultaneously display a different number of comments.

Figure 5:
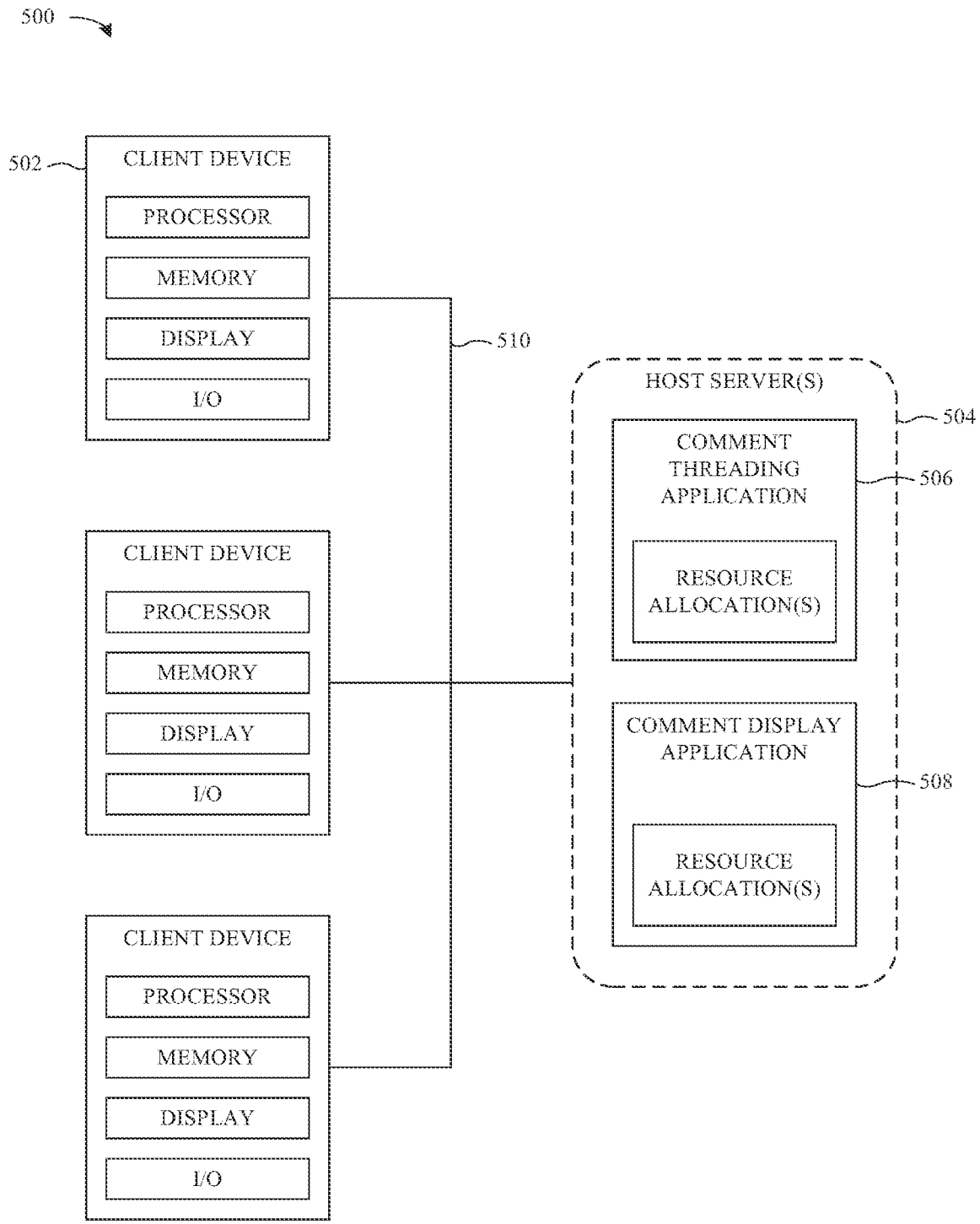
FIG. 5 depicts an example system for implementing comment threading at a content collaboration system in which various features of the present disclosure may be implemented.

FIG. 5 depicts an example content collaboration system 500 for implementing comment threading at a content collaboration system in which various features of the present disclosure may be implemented. In the illustrated embodiment, the content collaboration system is implemented with one or more client devices 502 that communicably couple (e.g., via one or more networking or wired or wireless communication protocols) to a host server 504. It may be appreciated that other client devices may be configured in a substantially similar manner as the client device 102, although this may not be required of all embodiments and different client devices can be configured differently and/or may transact data or information with, and/or provide input(s) to, the host server(s) 504 in a unique or device-specific manner.

In many embodiments, the host server(s) 504 is configured to operate within or as a virtual computing environment that is supported by one or more physical servers including one or more hardware resources such as, but not limited to (or requiring) one or more of: a processor; a memory; computer-readable memory or other non-volatile storage; networking connections; and the like. The host server(s) 504 can leverage such resources to instantiate a number of discrete subservices or purpose-configured modules, containers, or virtual machines each configured to perform, coordinate, serve, or otherwise provide one or more services, functions, or operations of the host server(s) 504, such as a comment threading application 506, and a comment display application 508. The comment threading application 506 and the comment display application 508 may be referred to herein as application platforms or simply platforms. While the current implementation depicted in FIG. 5 shows both systems (comment threading application 506, and comment display application 508) residing on the same host server(s) 504 or host server, in other implementations, any or all of the three systems may reside or be provided by a separate or discrete server.

In some implementations, the comment threading application 506 is an application platform that is configured to receive comments from the client device 502 (e.g., via user input provided through a graphical user interface rendered on a display, provided by one or more integrated applications), assign each comment a thread identification string as described herein, and add the comment along with its identification string to a comment index file. Similarly, the comment display application 508 is an application platform that can be configured to use the index file to display a subset of the comments contained within the index file at a graphical interface of the content collaboration system, for example, at a user interface of a client device 502.

The client device 502 can be any suitable personal or commercial electronic device and may include, without limitation or express requirement, a processor, volatile or non-volatile memory (identified, collectively, as the memory), and a display. Example electronic devices include, but are not limited to: laptop computers; desktop computers;

cellular phones (mobile phones); tablet computing devices; portable media players; and so on. It may be appreciated that a client device 502, such as described herein, can be implemented in any suitable manner.

In many embodiments, the processor of the client device 502 can be configured to execute an application (herein referred to as a "integrated application" or a "client application") stored, at least in part, in the memory. The integrated application can be used by a user to access and communicate with the host server(s) 504 and to securely transact information or data with, and provide input(s) to, the host server(s) 504. In some embodiments, the integrated application may include a browser application configured to access a web page or service hosted by the host server(s) 504 that is accessible to the client device 502 over a private or public network 510 that may, in some embodiments, include the open internet, a local area network, a wide-area network or other networked computing system.

In other applications, the hierarchical organization of comment data described herein can be applied to other nodal structures or constructs that use similar parent child relationships. For example, a document system tree in which various documents have different hierarchical relationships could utilize a thread identification strings to indicate the relationship of the various documents. In a confluence system, the hierarchical organization of thread identification strings within an index file could be used to organize nested content that is displayed at by the confluence system. In issue tracking systems, the hierarchical comment thread organization described herein could be applied to tickets that are used to identify and track issues and an interrelationship of the tracked issues. These are just a few examples of nodal or other parent-child constructs that is intended to illustrate the applicability of the current technology to other nodal structures or constructs that use similar patent child relationships.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A computer-implemented method for generating a comment field for a collaboration page of a content collaboration system, the computer-implemented method comprising:

receiving a comment at a user interface displaying the collaboration page comprising a plurality of comments, the collaboration page including the comment field having a predetermined number of content lines that are simultaneously viewable within the comment field;

creating a thread identification string for the comment, the thread identification string having a set of string portions, each string portion of the set of string portions denotes a hierarchical position of the comment with respect to one or more other comments of the plurality of comments;

obtaining a comment index file comprising an ordered list of previously-entered comments associated with the collaboration page, the ordered list of previously-entered comments having respective thread identification strings;

adding the comment and the thread identification string to the ordered list of previously-entered comments at a respective hierarchical position indicated by the thread identification string;

in response to a request, from an electronic device, to view a subset of comments in the user interface, determining a number of content lines displayable in the comment field;

creating a pagination of the ordered list of previously-entered comments in the comment index file based on the number of content lines in the comment field;

retrieving a subset of the ordered list of previously-entered comments in accordance with the pagination; and causing display of the subset of the ordered list of previously-entered comments in the comment field, wherein the subset of the ordered list of previously-entered comments changes in accordance with a change to the ordered list of previously-entered comments.

2. The computer-implemented method of claim 1, further comprising:

determining that the comment is a root-level comment; and in response to the determining that the comment is a root-level comment:

determining a root-level comment order based on a last-entered comment; and determining the thread identification string in accordance with the root-level comment order.

3. The computer-implemented method of claim 1, further comprising:

identifying the previously-entered comments with a same first-level string portion and a second-level string portion; and positioning the comment and the thread identification string to the ordered list of previously-entered comments based on a reply position of the comment relative to the previously-entered comments that is indicated by a third-level string portion.

4. The computer-implemented method of claim 1, wherein:

a first string portion designates a root-level level hierarchy relationship with respect to the one or more other comments; and the first string portion of the set of string portions corresponds to a time that a root-level comment was created, the root level comment corresponding to the comment.

5. The computer-implemented method of claim 4, wherein:

a second string portion designates a second-level hierarchy relationship with respect to the one or more other comments; and a second-level comment order corresponds to a reply position of the comment relative to other second-level comments that depend on the root-level comment.

6. The computer-implemented method of claim 5, wherein the determining the second-level comment order comprises determining a number of direct replies to the root-level comment and incrementing the number of direct replies by one.

7. The computer-implemented method of claim 1, wherein a length of the thread identification string is a predefined fixed length.

8. The computer-implemented method of claim 7, wherein:
the set of string portions comprise a first string portion and a second string portion; and
the first string portion has a first string length and the second string portion has a second string length, different from the first string length.

9. A computer-implemented method for storing comments received at a collaboration page of a content collaboration system in a hierarchical relationship that corresponds to positions of the comments in a comment field, the computer-implemented method comprising:
receiving a comment at a user interface displaying the collaboration page comprising a plurality of comments, the collaboration page including the comment field having a predefined number of simultaneously viewable content lines;
creating a thread identification string for the comment, the thread identification string having a set of string portions, each string portion of the set of string portions denotes a hierarchical position of the comment with respect to other comments of the plurality of comments, wherein a first string portion designates a root-level hierarchy with respect to a first comment of the other comments and a second string portion designates a second-level hierarchy with respect to a second comment of the other comments;
obtaining a comment index file comprising an ordered list of previously-entered comments associated with the collaboration page, the ordered list of previously-entered comments having respective thread identification strings;
adding the comment and the thread identification string to the ordered list of previously-entered comments at a respective hierarchical location indicated by the thread identification string;
in response to a request, from an electronic device, to view a subset of comments in the user interface, determining a number of content lines displayable in the comment field;
creating a pagination of the ordered list of previously-entered comments in the comment index file in accordance with the number of content lines in the comment field;
retrieving a subset of the ordered list of previously-entered comments in accordance with the pagination; and
causing display of the subset of the ordered list of previously-entered comments in the comment field, wherein the subset of the ordered list of previously-entered comments changes in accordance with a change to the ordered list of previously-entered comments.

10. The computer-implemented method of claim 9, further comprising:
determining that the comment has a third-level hierarchy that is dependent on the second-level hierarchy;
determining a third-level hierarchy of comment order based on a last-entered third-level hierarchy comment; and
determining a third string portion of the set of string portions in accordance with the third-level hierarchy of comment order.

11. The computer-implemented method of claim 9, further comprising:
determining a root-level comment order that a corresponding root-level comment was created relative to other root-level comments; and
determining the first string portion of the set of string portions in accordance with the root-level comment order.

12. The computer-implemented method of claim 9, further comprising:
determining a second-level hierarchy of comment order that a corresponding second-level hierarchy comment was created relative to other second-level hierarchy comments; and
determining the second string portion of the set of string portions in accordance with the second-level hierarchy of comment order.

13. The computer-implemented method of claim 9, wherein the first string portion and the second string portion each comprises a fixed string length.

14. The computer-implemented method of claim 9, wherein each thread identification string in the ordered list of previously-entered comments comprises a first string portion corresponding to a root-level hierarchy comment and a second string portion corresponding to a parent comment that is dependent from the root-level hierarchy comment.

15. The computer-implemented method of claim 14, wherein the comment is added to the ordered list of previously-entered comments based on a value of the thread identification string relative to values of the respective thread identification strings of the previously-entered comments.

16. A computer-implemented method for storing and displaying comments received at a collaboration page of a content collaboration system, the method comprising:
receiving a comment at a user interface displaying the collaboration page comprising a plurality of comments, the collaboration page including a comment field having a predetermined number of content lines that are simultaneously viewable in the comment field;
creating a thread identification string for the comment, the thread identification string having a set of string portions, each string portion of the set of string portions denotes a hierarchical position of the comment with respect to one or more other comments of the plurality of comments;
obtaining a comment index file comprising a list of previously-entered comments associated with the collaboration page that are ordered according to their respective thread identification strings;
adding the comment and the thread identification string to the list of previously-entered comments at a respective hierarchical location indicated by the list of previously-entered comments according to the thread identification string for the comment;
in response to a request, from an electronic device, to view a subset of comments in the user interface, determining a number of content lines displayable in the comment field;
creating a pagination of the list of previously-entered comments in the comment index file based on the number of content lines in the comment field;
retrieving a subset of the ordered list of previously-entered comments in accordance with the pagination; and
causing display of the subset of the ordered list of previously-entered comments in the comment field, wherein the subset of the ordered list of previously-entered comments changes in accordance with a change to the ordered list of previously-entered comments.

17. The computer-implemented method of claim 16, further comprising:
   determining a dependency of a corresponding parent comment to other comments; and
   determining a first set of string portions for the parent comment based on the dependency.

18. The computer-implemented method of claim 17, wherein:
   the corresponding parent comment is dependent on a root-level comment;
   the root-level comment comprises a root-level string portion; and
   the first set of string portions comprises the root-level string portion.

19. The computer-implemented method of claim 18, wherein the root-level string portion indicates the order the root-level comment was received at the collaboration page with respect to other root-level comments.

\* \* \* \* \*